United States Patent [19]
Lucidarme et al.

[11] Patent Number: 5,661,350
[45] Date of Patent: Aug. 26, 1997

[54] ELECTROMECHANICAL CONVERTER DEVICE, PRODUCING LINEAR MOTION

[75] Inventors: Jean Lucidarme, Ste Genevieve des Bois; Michel Lecrivain, Ivry sur Seine; Bernard Multon, Fresnes; Laurent Prevond, Villemomble, all of France

[73] Assignee: Ecole Normale Superieure de Cachan (Lesir), Cachan, France

[21] Appl. No.: 428,185
[22] PCT Filed: Nov. 3, 1993
[86] PCT No.: PCT/FR93/01086
  § 371 Date: May 3, 1995
  § 102(e) Date: May 3, 1995
[87] PCT Pub. No.: WO94/10742
  PCT Pub. Date: May 11, 1994

[30] Foreign Application Priority Data

Nov. 4, 1992 [FR] France ................... 92 13236

[51] Int. Cl.⁶ .................................................. H02K 41/00
[52] U.S. Cl. ................................................................ 310/12
[58] Field of Search ............................. 310/12, 13, 14

[56] References Cited

U.S. PATENT DOCUMENTS

| 4,837,467 | 6/1989 | Newman | 310/12 |
| 4,945,268 | 7/1990 | Nihei et al. | 310/12 |
| 4,963,809 | 10/1990 | Shingu et al. | 318/696 |
| 5,302,873 | 4/1994 | Takei | 310/12 |

FOREIGN PATENT DOCUMENTS

| 61-42270 | 2/1986 | Japan. |
| 61-295858 | 12/1986 | Japan. |

Primary Examiner—Steven L. Stephan
Assistant Examiner—Judson H. Jones
Attorney, Agent, or Firm—Young & Thompson

[57] ABSTRACT

A device for a linear actuator, including a mobile assembly moving relative to a stator in a traveling direction. The assembly includes an excitation winding and an armature comprising pole pieces and permanent magnets. The stator is a simple guide tube defining the path of the mobile assembly, and may be made from a profiled ferromagnetic material, with holes extending through two walls thereof to define stator poles in two rows mutually longitudinally offset by a half pitch.

12 Claims, 3 Drawing Sheets

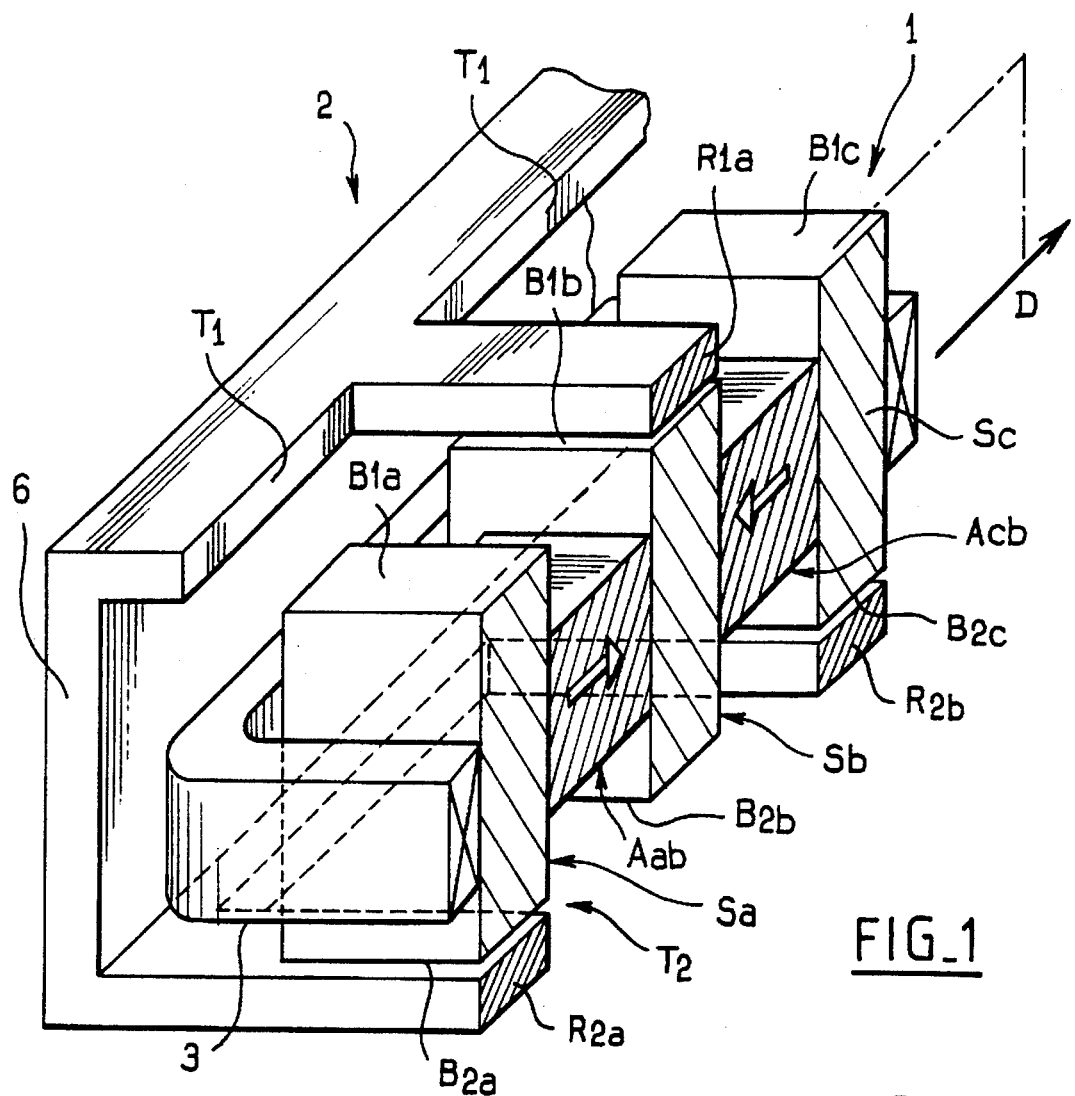
FIG_1
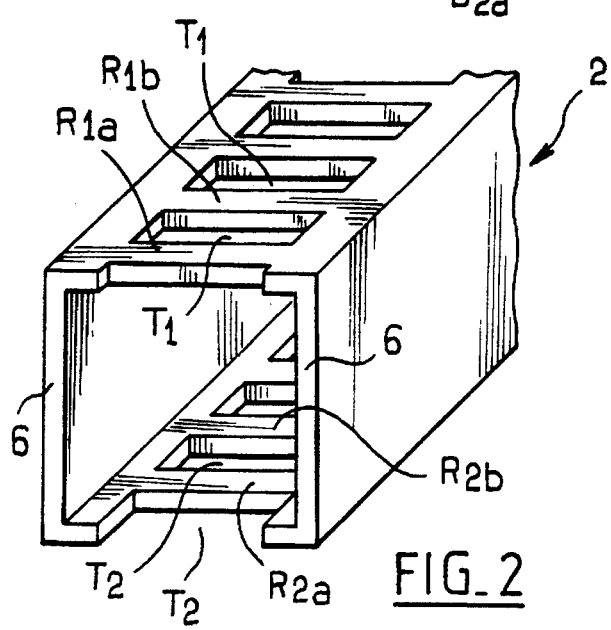
FIG_2
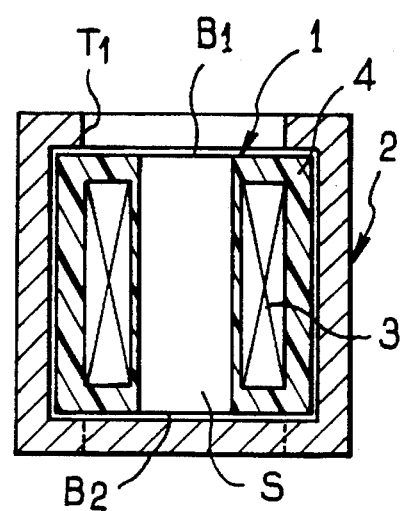
FIG_3

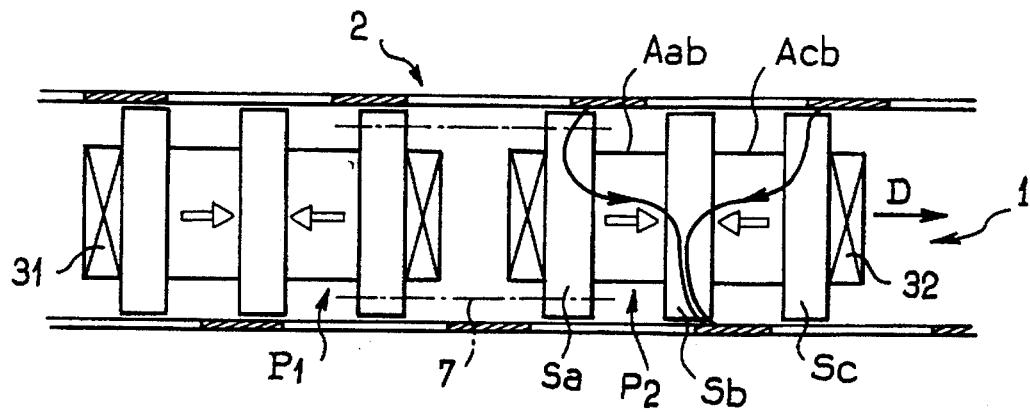
FIG._4
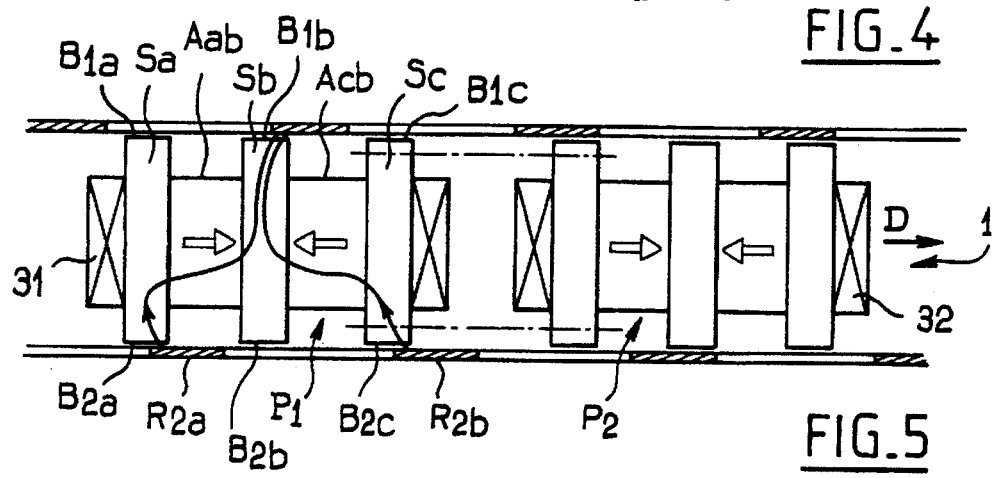
FIG._5
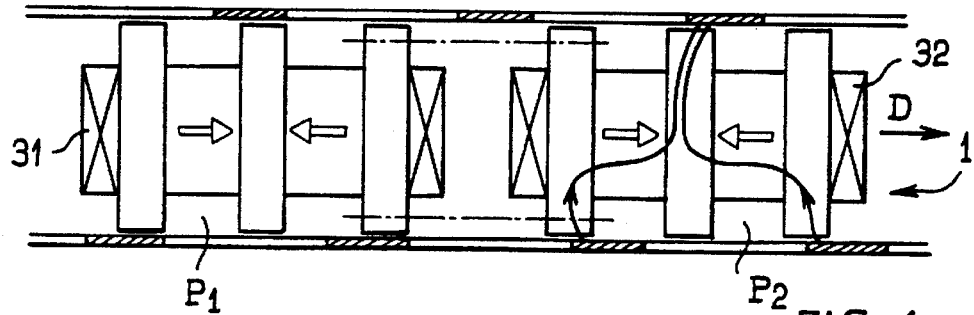
FIG._6
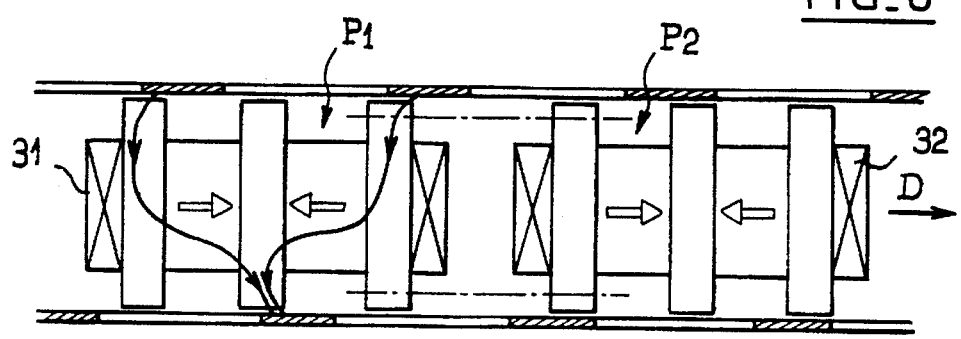
FIG._7

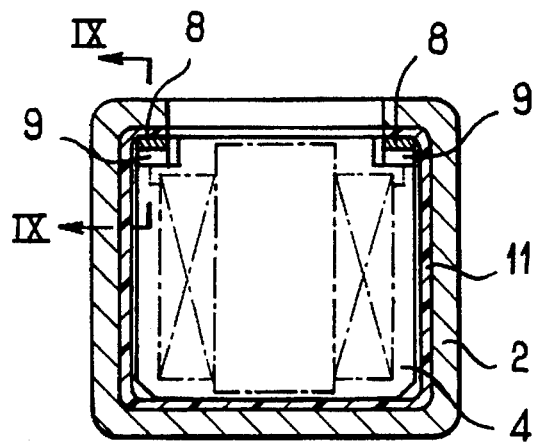
FIG_8
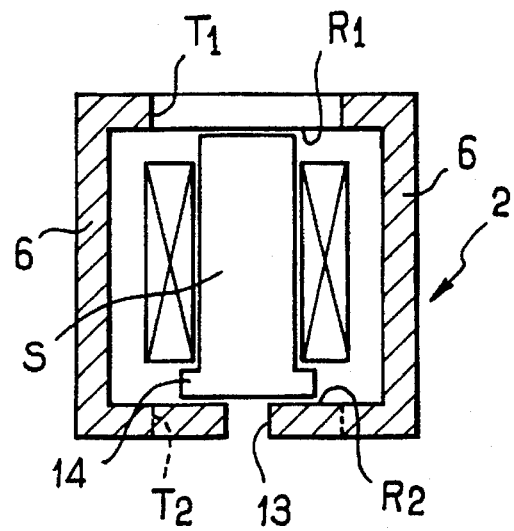
FIG_10
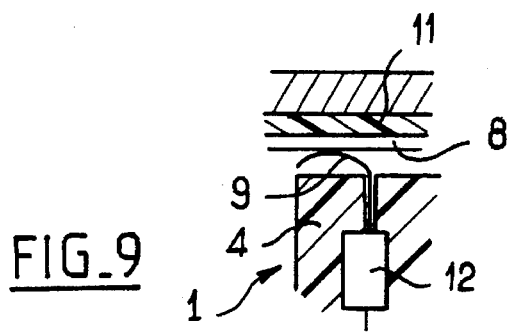
FIG_9
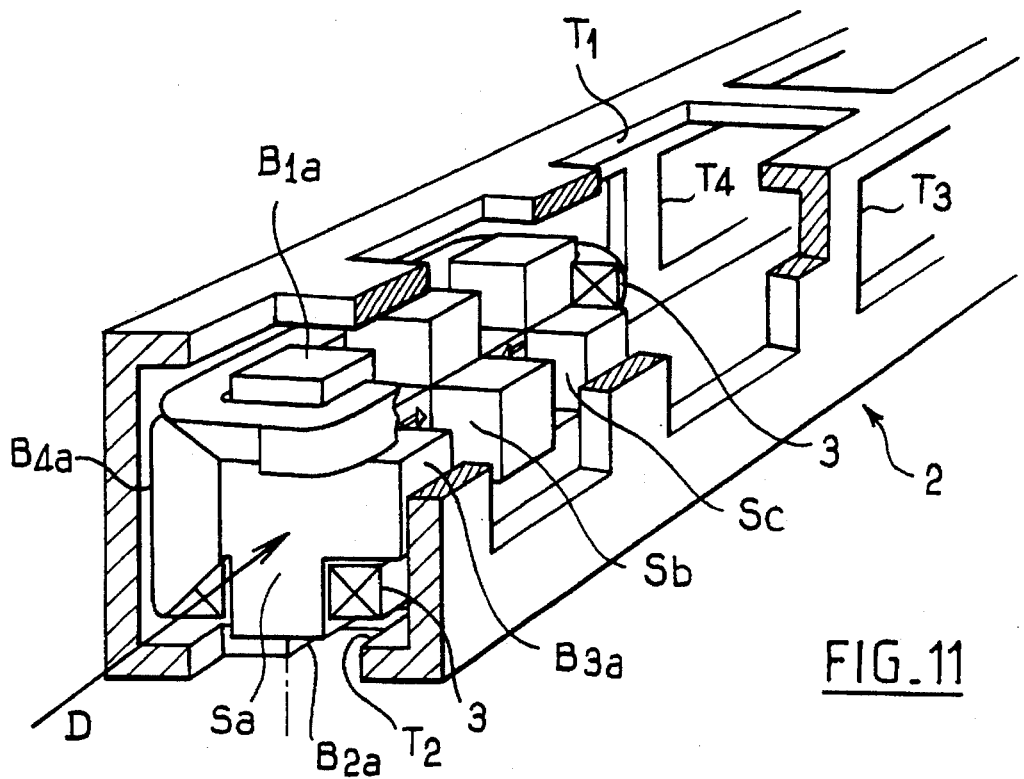
FIG_11

ELECTROMECHANICAL CONVERTER DEVICE, PRODUCING LINEAR MOTION

The present invention relates to an electromechanical converter device for producing a motion following any trajectory, in particular a linear trajectory.

Electric jacks and other linear actuators, in particular hybrids, are known, i.e. the magnetic flux of which is produced jointly by excitation windings and permanent magnets. These actuators contain complex stators with successive magnetic pieces and electrical windings along their entire length. Consequently, if the actuator is to have a significant useful movement, the cost of the stator becomes prohibitive.

The U.S. Pat. No. 4,963,809 describes a linear stepper actuator device designed to move horizontally a vertically suspended element, in particular a curtain. This device includes a guide tube in which a mobile assembly slides and which contains a scale constituted by a magnetic plate containing a row of teeth or holes distributed according to a pre-determined pitch.

This actuator device has the drawback of not employing a single force surface, which necessarily leads to very significant normal forces which must be countered by a consequent guide device. The possible compensation of these forces by symmetrization would involve a complete recast of the structure of this device due to the requirement to provide a slit for the passage of the carriage.

The Japanese Patent JP-A-61042270 describes a linear stepper motor including a stator with a cylindrical shape containing on its internal surface a series of annular teeth forming stator poles, and a mobile assembly sliding on a central shaft and containing two magnetic yokes coupled by a central permanent magnet and each provided with a winding.

The Japanese Patent JP-A-61295858 describes a linear stepper motor containing only a single row of stator poles arranged on the internal surface of a cylindrical stator.

The linear motors disclosed in these two Japanese Patents employ stator structures which are notched internally and which are relatively difficult to produce.

The aim of the present invention is to propose an electromechanical converter device which is simple and economical to produce.

It is desirable, for example, that the electromechanical converter device be sufficiently inexpensive to be usable in applications in buildings, such as the motorized operation of sliding doors and sliding shutters.

According to the invention, the electromechanical converter device including a stator made of magnetic material containing magnetic stator poles, and a mobile assembly containing at least one excitation winding and an armature defining the movable magnetic poles which in the positions of conjunction are opposite the magnetic stator poles, this stator being constituted by a guide tube containing recesses between which the stator poles are defined, and the mobile assembly being mounted in a sliding way in the guide tube and guided in a sliding manner by the guide tube, is characterized in that the magnetic stator poles are arranged in at least two rows of distinct stator poles, the armature comprises at least one permanent magnet placed between two pole pieces each having at least two movable poles each running in front of one of said rows of stator poles, and in that the stator and movable poles are arranged in such a way that in the first of two positions of conjunction of the armature, two first movable poles each belonging to one of the respective pole pieces coincide with two stator poles belonging to two rows of different stator poles while the two other movable poles are offset relative to the stator poles, whereas in the second of the two positions of conjunction, said two other movable poles coincide in turn with the movable stator poles, the two first movable poles being in turn offset relative to the stator poles.

Thus, according to the invention, at least one essential part of the magnetic and electrical functions which generate the motive force is transferred onto the mobile assembly such that the stator becomes a very simple item having the shape of a tube which can be split or closed. Moreover, this tube is used to guide the mobile assembly during its motion.

The device according to the invention therefore has the primordial advantage of a very great simplicity of production combined with favourable electrotechnical performances. In fact, the stator can be produced from a single extruded section in which the holes are cut. Moreover, in its simplest form the rotor only contains two parallelepiped magnetic pieces separated by a permanent magnet and surrounded by a single winding.

Preferably, the recesses separating the stator poles are simple holes arranged in rows along the extruded section.

Also preferably, the armature contains at least two pole pieces separated by a permanent magnet and each containing at least two poles, the stator poles being arranged in such a way that in the two positions of conjunction, respectively one of the poles of one of the pole pieces coincides with one stator pole and the other movable pole of the other pole piece of the armature coincides with a stator pole of another row. Thus, when the mobile assembly passes from one position of conjunction to the other, the stator poles commute the flux between one and the other of the two different paths through the armature.

Other details and advantages of the invention will emerge form the description hereafter.

In the attached drawings, given as non-limitative examples:

FIG. 1 is a perspective schematic view of an electromechanical converter device according to the invention, with a section taken along a median longitudinal plane;

FIG. 2 is a perspective view of a stator section suitable for the embodiment of FIG. 1;

FIG. 3 is a schematic view in section of the device of FIG. 1;

FIGS. 4 to 7 are four front views of the device of FIG. 1, at four successive stages of its operation, with a longitudinal section of the stator section;

FIG. 8 is a transversal sectional view of the device according to FIG. 1, in a useful embodiment;

FIG. 9 is a sectional view along IX—IX of FIG. 8, on an enlarged scale;

FIG. 10 is a similar view to FIG. 3 but is concerned with a variant of the embodiment; and FIG. 11 is a perspective view, with a partial section in several planes, related to a third embodiment, according to two variants.

In the example represented in FIGS. 1 to 3, the mobile assembly 1 of an electromechanical converter device which can be used to produce a linear actuator, more particularly rectilinear, contains in the example three ferromagnetic pole pieces S, S and S aligned in the travelling direction D to be produced so that the pole piece S is in the central position and the other two S and S are in the end position. Each pole piece has poles designated in a general manner by the letter "B", formed by the faces parallel to the travelling direction D and angularly distributed around it. In this first example represented in FIGS. 1 to 3, the pole pieces S are of a general parallelepiped shape flattened in the plane perpendicular to direction D, and each have a first movable pole B, B or B and a second opposing movable pole B, B or B. The first movable poles B, B and B belong to the same geometric surface, flat in the example, parallel to direction D, and the same is true for the second movable poles B, B and B.

As shown in FIG. 1, the movable poles B form, relative to the travelling direction D, the top of the projections of ferromagnetic material and therefore constitute the movable teeth of the actuator.

The central pole piece S is connected to each of the end pole pieces S and S by a permanent magnet A and A respectively. These two magnets are magnetized in opposite directions parallel to the travelling direction D. In the example, the direction of magnetization of the two magnets is directed towards the central pole piece S.

In addition, the mobile assembly includes an electric winding 3 which surrounds the entire arrangement of pole pieces S and permanent magnets A in a plane parallel to the movable poles B.

The stator 2 of the linear actuator is produced from a ferromagnetic tubular section with a cross section which is, for example, square, in which the mobile assembly 1 is mounted in a sliding way. For example, as is shown in FIG. 3, the active components of the mobile assembly 1 can be embedded in a parallelepiped block of resin 4 the external profile of which corresponds, within close sliding clearance, to the internal profile of the stator section 2. The block of resin 4 leaves exposed or only covers with a thin layer, the first poles B and the second poles B of the mobile assembly 1.

Two longitudinal rows of rectangular holes T1 and T2 respectively are cut through the walls of the stator section 2 which face the movable poles B. Within each row, the holes between them define a row of stator poles R, R, etc.; R, R, etc. The stator poles, which can be generally designated by the letter "R", can also be qualified as teeth. The rows of holes T and T are offset longitudinally one relative to the other so that each stator pole, such as R, is situated halfway, measured parallel to the travelling direction D, between two stator poles such as R and R of the other row.

At least one wall 6 of the stator section 2 connects in a continuous manner the two walls containing holes T and T so as to form a magnetic yoke between them.

The distance between the two stator poles of the same row, such as R and R in FIG. 1, is equal to the distance between the two end pole pieces S and S of the mobile assembly 1.

Therefore, as is shown in FIG. 1, the mobile assembly 1 can take up positions of conjunction in the stator 2, in which the central pole piece S has one of its poles, for example the first pole B, which coincides with a fixed pole of the corresponding row, in the example the fixed pole R, while the end pole pieces S and S have their other poles, i.e. the second poles B and B in the example, which coincide with two successive poles R and R of the other row of fixed poles.

It can be easily understood, and furthermore this will be explained later, that the mobile assembly 1 of FIG. 1 can take up another position of conjunction in which it is the second pole B of the central pole piece S which is coincident with a second fixed pole R, whilst the first poles B and B of the two end pole pieces S and S are coincident with the two first fixed poles successively.

As shown in FIGS. 4 to 7, in order to produce a linear actuator, a mobile assembly is mounted in the stator tube 2 containing two successive assemblies such as that described with reference to FIG. 1, fixed together by means 7 which can take whatever form is appropriate in order to respect the operation a description of which will follow.

The two sub-assemblies or phases P and P which form the mobile assembly 1 are connected together in such a manner that when one of the phases (P in FIG. 4) is in a position of conjunction, the other phase (P in FIG. 4) is mid-way between the two positions of conjunction.

From this position, in a step-by-step operating method, one supplies current to the winding 32 of phase P which is in an intermediate position so that the flux re-enters the end pole pieces S and S in order to cross the permanent magnets A and A following the direction of the permanent magnetism then leaves via the central pole piece S. The flux thus created closes up through the stator tube 2.

It can be seen that through the mobile assembly 1, the lines of flux thus produced in the pole pieces S, S and S of phase P are all overall directed downwards, which corresponds to a first direction of the current supplied to the winding 32. During this time, the winding 31 remains at rest. The magnetic forces produced in phase P displace the mobile assembly 1 towards the position represented in FIG. 5 corresponding to a position of conjunction for phase R and an intermediate position for phase P. At this stage the winding 32 of phase P is not supplied and winding 31 of phase P is supplied so that the lines of flux once again go from the end pole pieces S and S towards the central pole piece S. In this way, once again, the flux produced by the winding is added to that of the permanent magnets. However, this time, the end pole pieces S and S will coincide with the second fixed poles R and R. The result of which is that the lines of flux pass through the mobile assembly in an upwards direction, that is to say in the opposite direction to the flux which passed through phase P in FIG. 4 and consequently the winding 31 must be supplied with current in a second direction, opposite to the first.

The forces which result move the movable element into the position represented in FIG. 6, in which phase P is in its position of conjunction other than that of FIG. 4 and phase P again is found in an intermediate position. The winding 31 is unsupplied and winding 32 is supplied with current in the second direction, opposite to that of FIG. 4, in order to displace the mobile assembly 1 to the position represented in FIG. 7, from which position, by not supplying winding 32 and supplying current to winding 31 in the first direction the position returns to that of FIG. 4.

In an operating method running on autopilot, each winding is sent an alternating current wave synchronous with the alternating variation of the flux generated by the permanent magnets in the windings.

Thus, for each phase P or P, the stator poles R act as commutators of the magnetic flux thanks to which the flux follows one or other of two Y-shaped trajectories through each phase.

In order to supply the windings 31 and 32, the mobile assembly can be connected to fixed terminals via a flexible lead for example of the type having a helicoidal rest position. One can also, as represented in FIG. 8, place in the stator section 2, two supply rails 8 against which flexible brushes 9 carried by the mobile assembly 1 slide. The internal wall 2 of the section is, in the example represented, coated with a covering for example of polytetrafluoroethylene 11, which has both a very low coefficient of friction and electrical insulating properties. The resin block 4 slides against the covering 11. The rails 8 are fixed on the covering with if necessary additional insulation. In order to obtain the commutation which allows the selective and alternating supply of the two windings 31 and 32, one can envisage that a rail 8 is provided for each current direction, each of the rails carrying an alternation suitable for the conducting zones and insulating zones in order to distribute the current appropriately, in the direction desired and at the time desired, to each winding 31 or 32. Depending on the use the current return can be through the body of section 2 or through a non-represented return conductor, for example a third rail 8.

However, it is also possible, as illustrated more particularly in FIG. 9, to only provide two rails 8, having between them a uniform continuous voltage, the mobile assembly 1 containing a commutation device 12 to apply this current in the direction desired and at the moment desired to each of the windings. Numerous known processes exist to automatically commute a current in a mobile assembly of an electrodynamic machine. A proximity detector can be used which is mounted on the mobile assembly in order to detect the position of the mobile assembly relative to the fixed poles "R". For example, in a manner suitable to the invention, the current induced by the permanent magnets could be detected in the winding which is not supplied with current, the result of this detection giving an indication of the position of the mobile assembly relative to the fixed poles "R".

Detection of the external position can also be resorted to in order to take the position of the mobile assembly and to transmit to the mobile assembly control signals for the electric commutation, for example by the carrier current method.

In the examples described up to now, the stator section 2 has been described and represented as a closed tube, with the exception of holes T. This implies that the mobile assembly displaces the element to be controlled either via the intermediary of a rod projecting from the stator section 2 through one of its ends, or by action without contact, in particular magnetic action. For example, if the linear actuator serves for the control of a curtain, it can be envisaged that section 2 serves at the same time as the curtain rod, around which the rings to which the curtain is attached slide. At the front of the series of rings a slide made of magnetic material slides around section 2 at the same time as the mobile assembly 1 slides inside section 2.

However as represented in FIG. 10 one may also wish to have a direct coupling between the mobile assembly 1 and the element to be moved. In this case, section 2 can have a longitudinal slit 13, preferably through one of the walls containing holes T1 or T2 in such a way as to avoid interrupting one of the walls 6 forming the magnetic yoke. In order to compensate for the active surface removed from the stator poles R by slit 13, the pole pieces S contain a pole shoe 14 on the side of the wall through which the slit 13 passes. The slit can serve as an angular positioning means for the mobile assembly, so that the section of the tube could be round even if one does not want the mobile assembly to be able to turn about the axis of the tube.

The example represented in FIG. 11 will only be described as regards its differences relative to the previous examples.

The pole pieces S, S and S each contain four poles, for example, B, B, B and B distributed at angular intervals of 90° around the travelling direction D. Each wall of the stator section 2 contains rows of holes T and T, T and T. In the example illustrated by the right-hand part of FIG. 11, the holes such as T and T or also T and T situated on the walls opposite section 2 are facing one another and are longitudinally offset by a half pitch relative to the holes of the other two walls. Then there are only two windings 3 each surrounding the row of teeth adjacent to one of the two opposite walls, teeth B and B in the example. In this case the structure functions substantially as was described above, with the exception that the yokes are constituted by the corner regions of the section 2, which corresponds to the shortest magnetic paths. The two windings are always supplied in the opposite direction to one another in order to bring the flux towards the centre of the end pole pieces S and S, to allow it to pass through the two permanent magnets, then to deflect it from the centre of the central pole piece S towards the two opposing teeth.

According to another version illustrated by the left-hand part of FIG. 11, there are four windings each surrounding the teeth associated with one of the faces of the section, and all the rows of fixed poles are longitudinally offset relative to the three others by a quarter of a pitch, a half-pitch and three-quarters of a pitch respectively. Therefore, in each position of the mobile assembly, there are two rows of mobile poles B which define a position of conjunction and the two other rows define an intermediate position. By supplying current in the appropriate direction to the windings surrounding the mobile teeth which are in the intermediate position, and by not supplying current to the other two windings, the movement of the mobile assembly is brought about in direction D until the two rows of teeth, which were initially in the intermediate position, are now in the position of conjunction, while the two rows of teeth which were initially in the conjunction position reach an intermediate position. Then, the other two windings are supplied with current in the appropriate direction and the supply to the two windings which were supplied previously is suppressed so that the movement continues. In this way the two phases are materially combined into one and even induced and it is therefore no longer necessary for the mobile assembly to contain two sub-assemblies coupled together as was represented in FIGS. 4 to 7.

In all of the examples described, the active surfaces of the permanent magnets can be large relative to the air gap surfaces. The result of this is a higher excitation induction in the air gap. Thus even with inexpensive magnets, made of ferrite, performances are obtained which one would normally expect from much more expensive materials, such as rare earths.

In addition, the stator is simplified in the extreme and can have any function removed which requires localized items or controls or connections to be applied to this stator.

Of course, the invention is not limited to the examples described and represented.

It is not necessary for the mobile assembly to contain permanent magnets. It could simply contain a single bar of soft iron, corresponding to one of the pole pieces of FIG. 1, surrounded by a winding which is suitably commutated during displacement of this assembly.

Even if a hybrid structure is produced, i.e. with permanent magnets, all that is required to produce one phase is two pole pieces with a single permanent magnet, the use of three pole pieces and two magnets simply has the advantage of suppressing couples producing tilting on the mobile assembly during its sliding motion.

A section could be used without a longitudinal offset between the fixed poles, the pole pieces being for example arranged obliquely relative to the travelling direction of the mobile assembly, or also extended by pole pieces or pole shoes of an appropriate shape so as to produce the flux commutation described.

In relation to the embodiment of FIG. 11, the number of poles around the travelling axis of the mobile assembly can be increased further. Even in the case where the four rows of stator poles are all longitudinally offset relative to one another, only two windings can be envisaged, surrounding two rows of mobile poles each of which is in a position of conjunction.

In all the examples, the number of phases can also be increased, in particular in order to make the displacement force more uniform.

Section 2 can be produced in a curved or sinuous shape in order to guide the mobile assembly 1 along a corresponding trajectory.

A winding around each tooth can be envisaged in place of windings surrounding several teeth.

The mobile assembly can be mounted on small wheels or rollers in the tube.

We claim:

1. Electromechanical converter device including a stator of magnetic material containing magnetic stator poles (R, R, R, R), and a mobile assembly (1) containing at least one excitation winding (3; 31, 32) and one armature (S, S, S) defining mobile magnetic poles (B, b, c; B, b, c) which in positions of conjunction are facing the magnetic stator poles, this stator being constituted by a guide tube (2) containing recesses (T, T) between which the stator poles are defined, and the mobile assembly (1) being mounted in a sliding way in the guide tube (2) and guided in a sliding manner by the guide tube, the magnetic stator poles (R, R, R, R) being disposed in at least two rows of distinct stator poles, the armature containing at least one permanent magnet (A) placed between two pole pieces (S, S) each having at least two movable poles (B, B; B, B) each running in front of one of said rows of stator poles, and the stator and movable poles being so disposed that in the first of two positions of conjunction of the armature, the two first movable poles (B, B; B, B) each belonging to one of the respective pole pieces (S, S) coincide with two stator poles belonging to two rows of different stator poles while the two other movable poles are offset relative to the stator poles, whereas in the second of the two positions of conjunction, said two other movable poles coincide in turn with stator poles, the two first movable poles being in turn offset relative to the stator poles.

2. Device according to claim 1, wherein the recesses are holes (T, T).

3. Device according to claim 1, wherein the guide tube (2) is produced from an extruded section.

4. Device according to claim 1, wherein the guide tube (2) has a polygonal section and the mobile assembly (1) has an external section corresponding at least partially, so as to prevent the relative rotation of the stator (2) and the mobile assembly (1) about the axis of the tube.

5. Device according to one of claims 1 to 4, wherein the excitation winding (3; 31, 32) is supplied with current in two different directions according to whether the armature approaches the first position of conjunction or the second position of conjunction.

6. Device according to claim 1, wherein the rows of stator poles (R, R; R, R) are longitudinally offset relative to each other.

7. Device according to claim 1, wherein each pole piece contains four poles (B, B, B, B) and the guide tube (2) defines four rows of stator poles.

8. Device according to claim 1, wherein the armature contains three pole pieces (S, S, S) separated by two permanent magnets (A, A) being magnetized in opposite directions approximately parallel to the travelling direction (D) of the mobile assembly (1) in the guide tube (2).

9. Device according to claim 1, wherein the mobile assembly (1) contains at least two armatures each equipped with at least one winding (31, 32), and follow each other according to the travelling direction of the mobile assembly (1) in the guide tube (2), the two armatures being fixed to one another so as to be magnetically offset one relative to the other in relation to the stator poles (R, R; R, R).

10. Device according to claim 1, wherein for the mobile assembly (1) to be mounted in a slideable fashion in the guide tube (2), the internal wall of the extruded section is coated with a material (11) with a low coefficient of friction.

11. Device according to claim 1, wherein the armature of the mobile assembly (1) is embedded in a resin block (4) the external section of which approximately corresponds to the internal section of the guide tube (2).

12. Device according to claim 1, wherein inside the section at least one longitudinal electric supply rail (8) is provided, the mobile assembly (1) containing a contact (9) which co-operates with this rail.

* * * * *